US009734259B2

(12) United States Patent
Douglas et al.

(10) Patent No.: US 9,734,259 B2
(45) Date of Patent: *Aug. 15, 2017

(54) ALERT DRIVEN INTERACTIVE INTERFACE TO A WEBSITE MINING SYSTEM

(71) Applicant: AT&T Intellectual Property II, L.P., Atlanta, GA (US)

(72) Inventors: Shona Douglas, Madison, NJ (US); Junlan Feng, Basking Ridge, NJ (US); Mazin E. Gilbert, Warren, NJ (US)

(73) Assignee: AT&T Intellectual Property II, L.P., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/875,885

(22) Filed: Oct. 6, 2015

(65) Prior Publication Data

US 2016/0026734 A1 Jan. 28, 2016

Related U.S. Application Data

(63) Continuation of application No. 13/847,590, filed on Mar. 20, 2013, now Pat. No. 9,176,939, which is a continuation of application No. 11/264,650, filed on Nov. 1, 2005, now Pat. No. 8,429,148.

(51) Int. Cl.
*G06F 17/30* (2006.01)
*G06F 17/22* (2006.01)
*H04L 29/08* (2006.01)

(52) U.S. Cl.
CPC .... *G06F 17/30905* (2013.01); *G06F 17/2247* (2013.01); *G06F 17/30516* (2013.01); *G06F 17/30539* (2013.01); *G06F 17/30867* (2013.01); *H04L 67/02* (2013.01); *G06F 2216/03* (2013.01)

(58) Field of Classification Search
CPC ......... G06F 17/30864; G06F 17/3075; G06F 2216/03; G06F 17/30516; G06F 17/30867
See application file for complete search history.

(56) References Cited

U.S. PATENT DOCUMENTS

| | | |
|---|---|---|
| 5,604,855 A | 2/1997 | Crawford |
| 5,805,784 A | 9/1998 | Crawford |
| 6,498,921 B1 | 12/2002 | Ho et al. |
| 6,665,640 B1 | 12/2003 | Bennett et al. |
| 6,675,350 B1 | 1/2004 | Abrams et al. |
| 6,721,726 B1 | 4/2004 | Swaminathan et al. |
| 6,727,927 B1 | 4/2004 | Dempski et al. |
| 6,961,419 B2 | 11/2005 | Power et al. |
| 8,086,462 B1 | 12/2011 | Alonso et al. |
| 2002/0032740 A1* | 3/2002 | Stern ................ G06F 17/30864 709/206 |

(Continued)

OTHER PUBLICATIONS

David Zajic & Bonnie Dorr, Automatic Headline Generation for Newspaper Stories, DUC 2002, Workshop on Text Summarization, Jul. 11-12, 2002, Philadelphia, PA, USA.

*Primary Examiner* — Scott A Waldron
*Assistant Examiner* — Fatima Mina
(74) *Attorney, Agent, or Firm* — Chiesa Shahinian & Giantomasi PC

(57) ABSTRACT

Disclosed is a web server that includes a headlines module for automatically generating headlines based on data retrieved from a network (e.g., World Wide Web). The web server also includes an interactive agent for generating responses to inquiries relating to the headlines based on the data.

8 Claims, 5 Drawing Sheets

(56) References Cited

U.S. PATENT DOCUMENTS

| | | | |
|---|---|---|---|
| 2002/0085704 A1* | 7/2002 | Shires | H04M 3/5191 |
| | | | 379/265.04 |
| 2002/0156917 A1 | 10/2002 | Nye | |
| 2002/0184237 A1* | 12/2002 | McFeely | G06Q 10/10 |
| 2003/0187672 A1* | 10/2003 | Gibson | G06Q 30/02 |
| | | | 709/206 |
| 2005/0114324 A1* | 5/2005 | Mayer | G06F 17/30991 |
| 2007/0094232 A1 | 4/2007 | Dill et al. | |
| 2007/0202881 A1 | 8/2007 | Dervan | |

* cited by examiner

ALERT DRIVEN INTERACTIVE INTERFACE TO A WEBSITE MINING SYSTEM

This application is a continuation of prior application Ser. No. 13/847,590 filed on Mar. 20, 2013, which is a continuation of prior application Ser. No. 11/264,650 filed on Nov. 1, 2005, and issued as U.S. Pat. No. 8,429,148 on Apr. 23, 2013, the disclosures of which are herein incorporated by reference in their entirety.

BACKGROUND

The present invention relates generally to website mining, and more particularly to an alert driven interactive interface to a website mining system.

The Internet offers access to an enormous amount of information. If a current event occurs, many stories about the current event are accessible via the Internet. For example, if a scientist develops a new treatment for a disease, headlines associated with this new treatment are soon available on internet news sites. A headline is an important piece of news and can be, for example, the title of a story.

The determination of which pieces of information are newsworthy is, however, a difficult task. Typically, the headlines and stories are manually written to a web page. The manual entry of headlines and stories is labor intensive and takes time before the story or headline can be published on the Internet. As news changes quickly, the determination of which pieces of information is newsworthy is an on-going task.

Also, if a user wants to find out more information about the subject matter of a headline, the user often has to access a separate search engine to perform a search. The user then has to input search terms into a search engine to retrieve web pages relating to the search terms. A web search engine typically replies to a search request with numerous web pages having some information about the subject of the search request. These web pages may not have the specific information that the user was looking for, and the user may not find this out until searching through all of the returned web pages.

BRIEF SUMMARY

Therefore, there remains a need to rapidly identify pieces of information as newsworthy and to provide a single interface for enabling a user to ask a question relating to a headline based on these newsworthy pieces of information. Further, there remains a need to provide direct and precise responses to the question on this same interface.

In accordance with the principles of the present invention, a web server includes a headlines module for automatically generating headlines based on data retrieved from a network (e.g., World Wide Web). The web server also includes an interactive agent for generating responses to inquiries relating to the headlines based on the data. The interactive agent may be a search engine for searching data retrieved from the network. The web server can also include a data mining module for extracting data from web pages and for assigning attributes to the data. The data extracted is then put into a structured format by the data mining module. The attributes facilitate the determination of whether the data is newsworthy. The web server may also include a call router for receiving a request, correlating a telephone number (e.g., associated with an agent for answering said request) with the request, and initiating a call to the telephone number. The call router may communicate with the data mining module to obtain the telephone number.

As described above, the data mining module assigns attributes to the data. The attributes can include time, name of a person, name of a place, name of a service, name of a product, properties of products and services, and/or Products and Service Ontology (i.e., a hierarchical tree). In one embodiment, the headlines module selects headlines generated from information that has changed over time or information that has a particular characteristic (e.g., a geographic limitation). A headline that is generated from information that has changed over time is a headline based on information that has changed from a first point in time to a second point in time.

In one embodiment, the inquiries are in the form of natural language queries, keywords, and keyword search patterns.

These and other advantages of the invention will be apparent to those of ordinary skill in the art by reference to the following detailed description and the accompanying drawings.

DETAILED DESCRIPTION

The identification of information that is newsworthy is a difficult, burdensome and time-consuming task. Often, someone has to manually search for and input a news story and an associated headline into a computer to display the story and headline on a web page. The retrieval of follow-up information about a subject matter of the headline can also be a troublesome endeavor. People often have to access one web page for news and another web page, such as a search engine, for retrieving follow-up information about a subject matter of a headline. Further, a search engine typically retrieves web pages related to search terms. The person usually has to then access each web page returned by the search engine to evaluate the search results. Sometimes, none of the web pages have the answer that the person was looking for.

Figure 1:
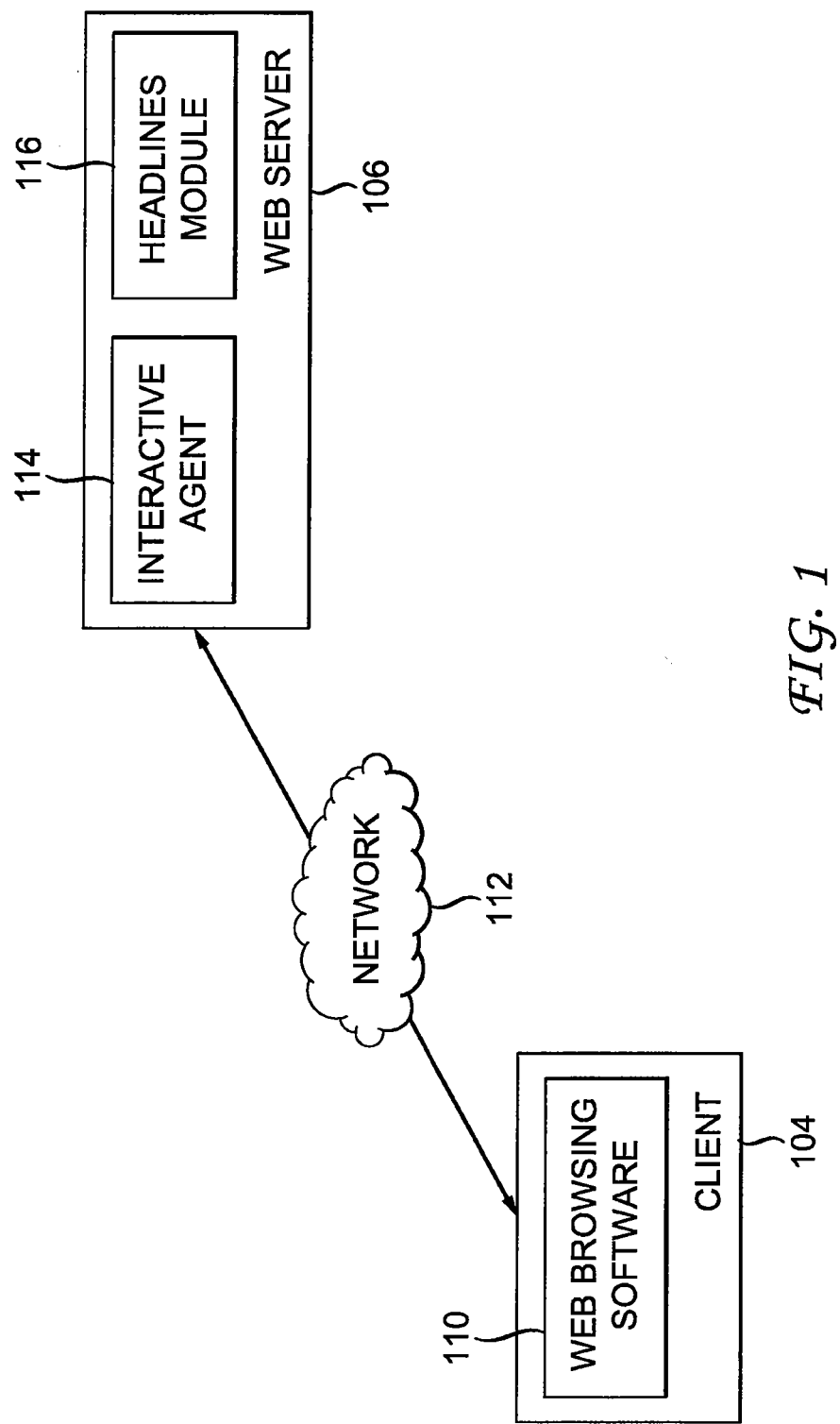
FIG. 1 shows a high level block diagram of a network having a web server with an interactive agent and a headlines module in accordance with an embodiment of the invention.

FIG. 1 shows a high level block diagram of a network including a client computer (i.e., client) 104 and a web server 106. A user of the client 104 uses web browsing software 110 to access web pages retrieved from the web server 106 over the network 112.

The web server 106 hosts an interactive agent 114 and a headlines module 116. As described in more detail below, the interactive agent 114 provides an interface on a web page for a user to inquire about a particular subject relating to a headline. The interface is any area (e.g., a dialog box) on the web page that the user can input a question about a particular subject matter relating to a headline.

The headlines module 116 transmits headlines to the client 104 (i.e., to the web browsing software 110). The headline may be, for example, a page banner on the web page. The headlines transmitted to the client 104 are automatically generated by the headlines module 116 and based on information determined to be newsworthy. As described in more detail below, the information is determined to be newsworthy based on attributes of the data that are mined by a data mining module.

The headlines can be generated from information that has changed over time. A headline generated from information that has changed over time is a headline based on information that has changed from a first point in time to a second point in time. For example, a headline may be a price reduction of a laptop for sale. The price of the laptop has changed over time—it has been reduced from $X to $Y, where Y is less than X, within a period of time.

The headlines can also be generated from information that has one or more characteristic. Headlines generated from information having one or more characteristics may be based on, for instance, a geographic limitation. An example of a headline that is generated based on information that has a particular characteristic is when a new web page is added to a web site about a new product. The headlines module 116 may generate a headline based on the subject matter (i.e., product) of the new web page if the product has a particular characteristic, such as that it is software released within the last two days. The determination that information has a particular characteristic is determined by a data mining module.

Further, the headlines module 116 may determine which headlines to display out of many possible headlines. For example, over the course of a predetermined period of time (e.g., a day), the headlines module 116 may generate a particular number (e.g., 100) of potential headlines. The headlines module 116 may then select a predetermined subset of the generated headlines for display on the web browsing software 110.

The headlines provide the user with a potential subject matter that the user can ask about in an inquiry. In one embodiment, the inquiries are related to the headlines. The headlines may also change as the user poses an inquiry. For example, if a headline relates to the price of computers and the user asks how much a particular computer model costs, the next headline may be about the particular computer model. The change in headline may provide the user with additional information associated with his inquiry and may affect the user's next question(s).

The interactive agent 114 enables the user to ask, via the web browsing software 110, one or more inquiries related to the headlines. Rather than responding to the user's inquiry with multiple web pages, the interactive agent 114 provides a precise and direct answer to the user's inquiry. The interactive agent 114 may also provide suggested web pages to the user if the user wants to obtain follow-up information related to the inquiry.

Figure 2:
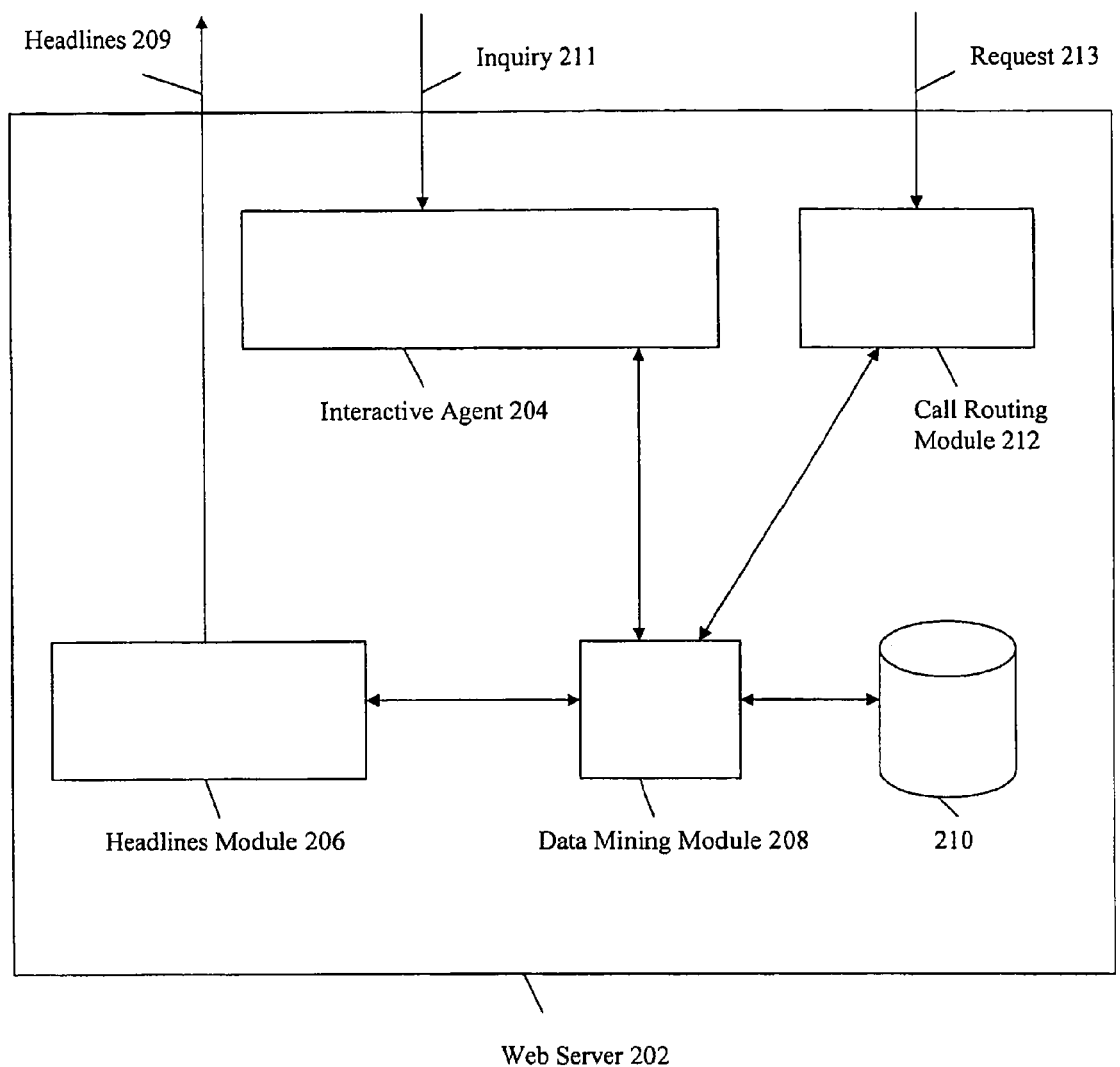
FIG. 2 is a more detailed block diagram of a web server in accordance with an embodiment of the invention.

FIG. 2 shows a block diagram of web server 202 having an interactive agent 204 and a headlines module 206. The interactive agent 204 and the headlines module 206 communicate with a data mining module 208 to retrieve data from database 210. The web server 202 uses the data from database 210 to generate headlines and to respond to inquiries.

The data mining module 208 extracts data from web pages accessed via the network (e.g., Internet) 112 and stores the data in database 210. In one embodiment, the data mining module 208 converts the data into a structured format (e.g., organizes the data). The data mining module 208 assigns attributes to the extracted data. These attributes facilitate the automatic generation of headlines 209. An attribute that is assigned to extracted data is a time associated with the information. The data mining module 208 may review the web page and determine a time associated with the information.

Other data attributes that can be assigned to data include the names of people, places, products, etc. extracted from the web page. For example, data mining module 208 may assign the geographic location of a service offered by a web page as an attribute of the data extracted from the web page.

In one embodiment, the user of the client 104 defines the attributes that the data mining module 208 extracts. Alternatively, the web server 202 defines the attributes that the data mining module 208 extracts. The attributes are stored with the data in the database 210.

The data mining module 208 communicates with interactive agent 204 to respond to one or more inquiries 211. In one embodiment, the interactive agent 204 is a question/answer (QA) system. The QA system recognizes the context of an inquiry 211 with respect to previous inquiries. For example, if a headline 209 is "Virus X has infected 50,000 personal computers over the past two days" and a user asks "What software counteracts Virus X?," the interactive agent 204 replies "Software A counteracts Virus X." The user may then ask, "How much is the software?" The interactive agent 204 recognizes that "the software" in the second inquiry relates back to the answer to the user's first inquiry—i.e., "Software A". "Software A" is identified from its context. Specifically, "Software A" is the main object in the first question and the second phrase having "the software" implies that it refers to an instantiation (i.e., "Software A") mentioned previously.

Instead of being a QA system, the interactive agent 204 may alternatively be a search engine. The interactive agent 204 then responds to inquiries with web pages related to the user's inquiry 211. Instead of being a QA system, the interactive agent 204 may alternatively be a virtual dialog agent, which not only answers users' questions, but also assists the user in performing transactions such as bill payment, guides the user to ask legitimate questions, informs the user of the system's updates, etc.

In one embodiment, the headlines 209 generated by the headlines module 206 may change based on the inquiries 211 asked by the user. A follow up headline to the example above may be headlines associated with the price of all software countering Virus X (including Software A). As the user's inquiries 211 vary, the headlines vary according to the inquiries 211 and/or the responses to the inquiries 211.

The web server 202 may also include a call routing module 212. The call routing module 212 displays on the web browsing software 110 a telephone number of an agent who is knowledgeable in the subject matter of the inquiry (or response). In one embodiment, the call routing module 212 associates a phone number with a user's request (e.g., my phone doesn't work). In the example above, the call routing module 212 may provide the telephone number of someone who works in a computer store that sells Software A and is knowledgeable in Software A.

In another embodiment, rather than providing a telephone number to the web browsing software 110 in response to a request 213, the call routing module 212 provides an icon (e.g., of a telephone) to the web browsing software 110. The icon is the interface between the user and the call routing module 212. The call routing module 212 retrieves the telephone number from the data mining module 208. In one embodiment, the telephone number is an attribute of the data stored in the database 210. All of the information extracted from a web page may, therefore, have a telephone number associated with the information.

Alternatively, the call routing module 212 requests a telephone number from the database 210 upon a request 213 from the web browsing software 110. The request 213 may be implemented by a user clicking on the icon displayed by the web browsing software 110. Once the icon is clicked, the call routing module 212 requests the data mining module 208 to extract a telephone number from data related to the inquiry (stored in the database 210). The call routing module 212 then calls the telephone number of the knowledgeable individual(s), for example, through Voice Over Internet Protocol (VoIP).

Figure 3:
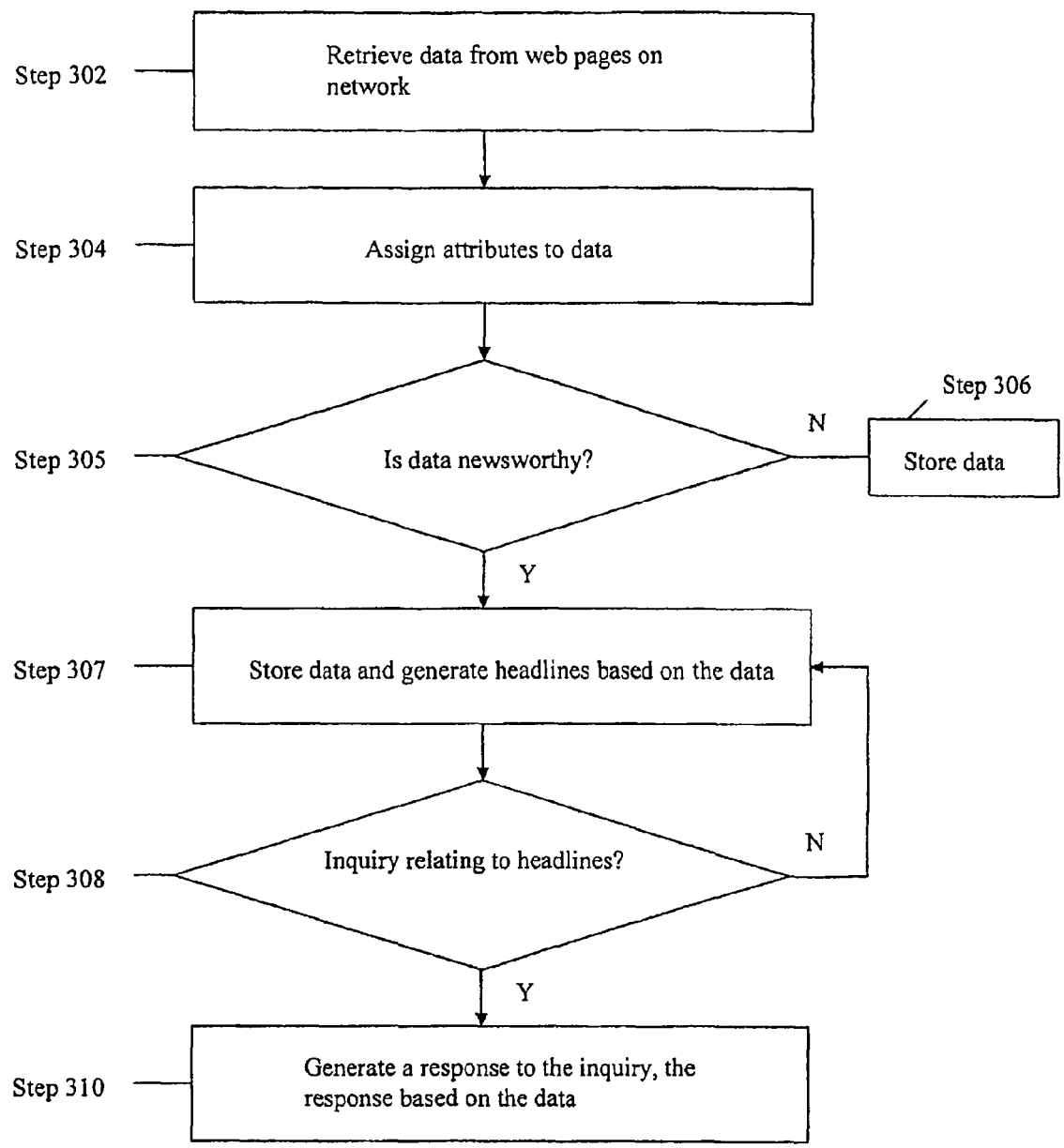
FIG. 3 is a flowchart showing the steps performed by the web server in accordance with an embodiment of the invention.

FIG. 3 illustrates a flow chart of the steps performed by the web server 202. The web server 202 first retrieves data from web pages on the network 112 in step 302. This retrieval process can occur periodically (e.g., once every day) or at a scheduled time (e.g., Mondays and Wednesdays at 2 PM). The data mining module 208 then mines the data and extracts attributes from the data. The data mining module 208 assigns these attributes to the data in step 304. For example, if a web page has a date at the beginning of a story, and if the data mining module 204 extracts the story and various pieces of information from the story, the data mining module 204 assigns the date to the story and the pieces of information from the story.

The data mining module 208 then determines if the data is newsworthy in step 305. This determination is based on the attributes assigned to the data. The data mining module 208 calculates a measure of the significance of the attribute(s), either viewed as a time series or as a static collection with respect to a predetermined standard of what is newsworthy. This predetermined standard of what is newsworthy may remain fixed or may change. If the data mining module 208 determines that the data is not newsworthy, the data mining module 208 stores the data in the database 210 in step 306. In one embodiment, the data mining module 208 mines the data such that the link between the attribute(s) and the web pages that correspond to the data (and, therefore, to the attributes) are maintained.

If the data mining module 208 determines that the data is newsworthy, the data is stored and the headlines module 206 generates headlines 209 based on the stored data in step 307. It should be noted that the data may have been stored prior to this step. The headlines module 206 displays these headlines 209 on the web browsing software 110. The headlines module 206 may change the headlines 209 displayed on the web browsing software 110 (e.g., periodically) by providing new headlines to the web browsing software 110. As described above, the headlines module 206 may change the headlines 209 based on the attributes of the data. In another embodiment, the user can customize which headlines are provided to the web browsing software 110 via options displayed on the web browsing software. Further, the data mining module 208 may determine that data is going to become newsworthy based on the previous attributes associated with the data.

This determination may be based on the tracking of a website (and therefore data) over a period of time. For example, if a particular term appears on a web site four times over the course of a year and then begins appearing on the same website hundreds of times over a period of days, the data mining module 208 may determine that this data has become newsworthy based on the recent frequency of the particular term (or terms). This determination can automatically occur and facilitates the rapid determination of which data is newsworthy. In one embodiment, the data mining module 208 assigns the number of times that a particular term appears on a web site as an attribute to the data and uses this attribute to later determine that the information has become newsworthy. As a result of the information becoming newsworthy, a corresponding headline is generated.

The interactive agent 204 then determines whether the user provides an inquiry 211 relating to a headline 209 in step 308. If the interactive agent 204 does not receive an inquiry, the interactive agent 204 waits in a loop for an inquiry 211. During this wait loop, the headlines module 206 may generate one or more new headlines 209 (in step 306). If the interactive agent 204 receives an inquiry unrelated to a headline 209, the interactive agent 204 may retrieve a response from the data stored in the database 210 or may generate new headlines in step 306. If the interactive agent 204 receives an inquiry 211 related to a headline 209, the interactive agent 204 communicates with the data mining module 208 to search for a response. The interactive agent 204 then provides the response to the web browsing software 110 in step 310. In some embodiments, the interactive agent 204 provides several responses to the web browsing software 110 and the user selects the most appropriate response.

Figure 4:
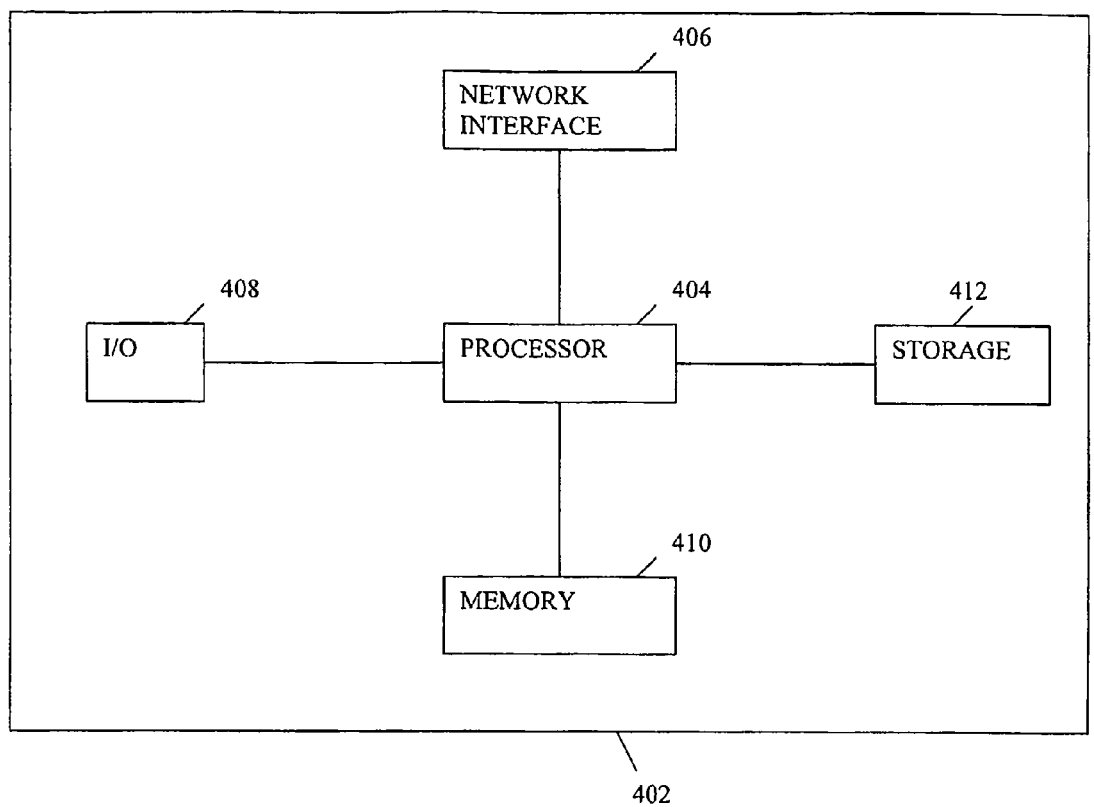
FIG. 4 shows a high level block diagram of a computer system which may be used in an embodiment of the invention.

A high level block diagram of a computer implementation of the web server 202 is shown in FIG. 4. Web server 402 contains a processor 404 which controls the overall operation of the computer by executing computer program instructions which define such operation. The computer program instructions may be stored in a storage device 412 (e.g., magnetic disk) and loaded into memory 410 when execution of the computer program instructions is desired. Thus, the web server operation will be defined by computer program instructions stored in memory 410 and/or storage 412 and the computer will be controlled by processor 404 executing the computer program instructions. Computer 402 also includes one or more network interfaces 406 for communicating with other devices via a network. Web server 402 also includes input/output 408 which represents devices which allow for user interaction with the computer 402 (e.g., display, keyboard, mouse, speakers, buttons, etc.). One skilled in the art will recognize that an implementation of an actual computer will contain other components as well, and that FIG. 4 is a high level representation of some of the components of such a computer for illustrative purposes.

Figure 5:
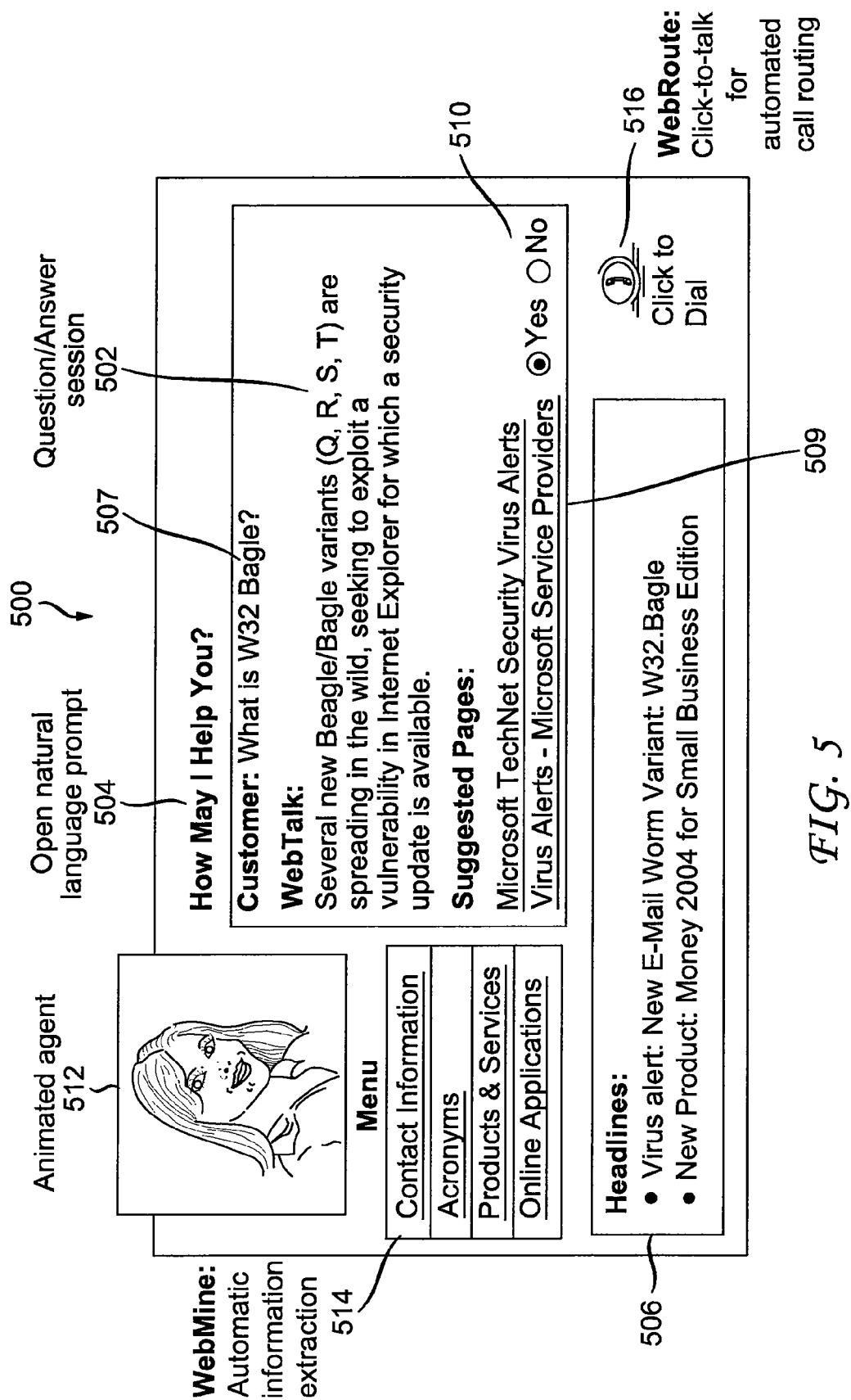
FIG. 5 is a screen shot of a web page generated by the web server in accordance with an embodiment of the invention.

FIG. 5 shows a screen shot of a web page (also referred to below as an interface) 500 generated by web server 402 and displayed by the web browsing software 110. The web page 500 has a question/answer session 502 provided by the interactive agent. The interactive agent 502 begins a question/answer session with a natural language prompt 504. In one embodiment, the natural language prompt 504 is a text-based question (e.g., "How May I Help You?"), as shown. The interactive agent 502 may also verbalize the initial prompt (e.g., "How May I Help You?"). The question may also be "spoken" by the web server 402 as well as displayed on the web page (i.e., verbal and text-based question).

The web page 500 also includes headlines 506 generated by the headlines module. Examples of headlines 506 include 1) Virus alert—New E-Mail Worm Variant: W32.Bagle and 2) New Product: Money 2004 for Small Business Edition. As described above, the headlines 506 provided by the headlines module to the web browsing software may change periodically or in response to an inquiry.

The user (also referred to below and in FIG. 5 as customer) then poses an inquiry 507 related to a headline 506. As shown, the customer first asks, "What is W32 Bagle?" The interactive agent retrieves the inquiry 507 and communicates with the data mining module to obtain a response to the inquiry 507. When a response is retrieved, the interactive agent provides the response 508 to the web browsing software 110 for display. For example, in response to the previous customer question of "What is W32 Bagle?", the interactive agent replies, "Several new Beagle/Bagle variants (Q, R, S, T) are spreading in the wild, seeking to exploit a vulnerability in Internet Explorer for which a security update is available."

In one embodiment, the interactive agent may also provide suggested web pages 509 as part of a response. The suggested web pages 509 are web pages relating to the inquiry 507 and/or response 508. The question/answer session 502 may also include a user feedback section 510. The user feedback section 510 provides a user with an opportunity to provide feedback on the responses 508 provided by the web server. The user can provide whether the response 508 was what the user was looking for by clicking a Yes or No button, as shown. Although shown with a Yes or No button, the user feedback section 510 may be a dialog box for a user to type in what the user thought about the response 508. The user's feedback may also be verbal.

The web page 500 can additionally include an animated agent 512 that moves and/or provides different expressions based on the headlines and/or question/answer session 502. The animated agent 512 can also provide assistance to a user on how to use the interface 500 or a module in the interface 500. The animated agent 512 may be any shape or size and may speak, make gestures, etc.

In one embodiment, the web page 500 also includes a WebMine 514. The WebMine 514 is provided by the data mining module described above and enables a user to extract information from the web. Additionally, the web page 500 includes a WebRoute 516 for a user to click a button to enable the user to speak to someone on the telephone who is knowledgeable in the subject matter of the headline.

The functionality of one or more of the modules described above can be combined with any number of the other modules. For example, the functionality associated with the data mining module (e.g., WebMine 514) can be combined with the call routing module (e.g., Web Route 516) into a single module on the interface 500.

Further, one or more of the different modules in the interface 500 can be employed in a cooperative manner. For example, a user may log onto the web page 500 and request assistance from the animated agent 512. The animated agent 512 provides assistance to the user, such as by describing the functions of each aspect of the web page 500 (and, therefore, of each module). In some embodiments, the user can communicate with the animated agent 512 in a variety of manners, such as verbally or via textual input. The user can then use the WebMine 514 to extract information from the web. For example, the user can use the WebMine 514 to extract product information from the web. The user would select "Products and Services" from the Menu and a follow-up menu may be provided to the user. Alternatively, the user selects "Products and Services" from the Menu and the WebMine 514 extracts information about different products and services (e.g., that meet a predetermined criteria, such as software that has been released within the last two months). Alternatively, the user can type in a product that the user is searching for.

The headlines module may then generate headlines 506 based on the information extracted by the WebMine 514. As described above, the generation of headlines 506 may be based on the attributes assigned to the information extracted from the web. The headlines module displays the headlines 506 associated with the extracted information. The user can then pose an inquiry 507 in the question/answer session 502. The inquiry 507 may be related to one or more of the headlines 506. The interactive agent receives the inquiry 507 and then uses the stored data extracted by the WebMine 514 to provide a response 508 to the user. The interactive agent may also provide suggested web pages 509 to the user. These suggested web pages can include web pages related to the inquiry 507, the response 508, and/or to the headlines 506. At any time throughout this process, the user can also use WebRoute 516 to call someone knowledgeable in the subject matter of the headlines. In one embodiment, the WebRoute 516 determines which person to call from a list of potential people based on the headlines 506. In another embodiment, the WebRoute 516 determines which person to call from a list of people based on the response 508 to the inquiry 507. Thus, as described, each module in the interface 500 can work with one or more of the other modules in the interface 500 to provide one or more services to a user or customer.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method comprising:
   extracting data from a web page via a network;
   assigning attributes to the data;
   identifying a standard associated with the data, the standard changing over a time period;
   calculating a measure of significance of the attributes as a time series with respect to the standard over the time period;
   determining if data from the web page is newsworthy based on the measure of significance;
   receiving a first inquiry from a user;
   automatically generating headlines for display to the user, a first one of the headlines based on the first inquiry, a previous inquiry from the user related to one of the headlines, and an answer to the previous inquiry, and second one of the headlines based on newsworthy data and data from the web page that has changed from a first point in time to a second point in time, wherein the second one of the headlines is related to a price reduction of a product;
   identifying a telephone number of an agent knowledgeable in subject matter of the first inquiry; and
   initiating a telephone call to the telephone number in response to a request from the user.

2. The method of claim 1, wherein the price reduction of the product is determined based on the data from the web page that has changed from the first point in time to the second point in time.

3. The method of claim 1, wherein the first inquiry is related to the answer to the previous inquiry.

4. An apparatus comprising:
a processor; and a memory to store computer program instructions, the computer program instructions when executed on the processor, cause the processor to perform operations comprising:
extracting data from a web page via a network;
assigning attributes to the data;
identifying a standard associated with the data, the standard changing over a time period;
calculating a measure of significance of the attributes as a time series with respect to the standard over the time period;
determining if data from the web page is newsworthy based on the measure of significance;
receiving a first inquiry from a user;
automatically generating headlines for display to the user, a first one of the headlines based on the first inquiry, a previous inquiry from the user related to one of the headlines, and an answer to the previous inquiry, and a second one of the headlines based on newsworthy data and data from the web page that has changed from a first point in time to a second point in time, wherein the second one of the headlines is related to a price reduction of a product;
identifying a telephone number of an agent knowledgeable in subject matter of the first inquiry; and
initiating a telephone call to the telephone number in response to a request from the user.

5. The apparatus of claim 4, wherein the price reduction of the product is determined based on the data from the web page that has changed from the first point in time to the second point in time.

6. The apparatus of claim 4, wherein the first inquiry is related to the answer to the previous inquiry.

7. A non-transitory computer readable medium storing computer program instructions, which, when executed on a processor, cause the processor to perform operations comprising:
extracting data from a web page via a network;
assigning attributes to the data;
identifying a standard associated with the data, the standard changing over a time period;
calculating a measure of significance of the attributes as a time series with respect to the standard over the time period;
determining if data from the web page is newsworthy based on the measure of significance;
receiving a first inquiry from a user;
automatically generating headlines for display to the user, a first one of the headlines based on the first inquiry, a previous inquiry from the user related to one of the headlines, and an answer to the previous inquiry, and second one of the headlines based on newsworthy data and data from the web page that has changed from a first point in time to a second point in time, wherein the second one of the headlines is related to a price reduction of a product;
identifying a telephone number of an agent knowledgeable in subject matter of the first inquiry; and
initiating a telephone call to the telephone number in response to a request from the user.

8. The non-transitory computer readable medium of claim 7, wherein the price reduction of the product is determined based on the data from the web page that has changed from the first point in time to the second point in time.

* * * * *